United States Patent
Shah

(12) 
(10) Patent No.: US 6,922,498 B2
(45) Date of Patent: Jul. 26, 2005

(54) FIBER-OPTIC MATRIX SWITCH USING PHASED ARRAY ACOUSTO-OPTIC DEVICE

(75) Inventor: Manhar L. Shah, Melbourne Beach, FL (US)

(73) Assignee: MVM Electronics, Inc., Melbourne, FL (US)

(*) Notice: Subject to any disclaimer, the term of this patent is extended or adjusted under 35 U.S.C. 154(b) by 137 days.

(21) Appl. No.: 10/248,659

(22) Filed: Feb. 5, 2003

(65) Prior Publication Data

US 2004/0151422 A1 Aug. 5, 2004

(51) Int. Cl.[7] .......................... G02F 1/335; G02B 6/26; G02B 6/42
(52) U.S. Cl. ............................... 385/17; 385/7
(58) Field of Search ........................ 385/7, 17

(56) References Cited

U.S. PATENT DOCUMENTS

| | | | |
|---|---|---|---|
| 5,165,104 A | * 11/1992 | Weverka | 385/7 |
| 5,251,058 A | * 10/1993 | MacArthur | 359/249 |
| 6,236,479 B1 | 5/2001 | Gosselin et al. | |
| 6,282,336 B1 | 8/2001 | Riza | |
| 6,363,182 B2 | 3/2002 | Mills et al. | |
| 6,424,451 B1 | 7/2002 | Chang | |
| 6,483,962 B1 | 11/2002 | Novotny | |
| 2004/0105485 A1 | * 6/2004 | Bures et al. | 374/142 |

* cited by examiner

Primary Examiner—Akm Enayet Ullah
Assistant Examiner—Tina M Lin

(57) ABSTRACT

A high-speed high-isolation fiber-optic matrix switch using only one acousto-optic device with phased array transducers is disclosed. Previously disclosed fiber-optic switches either required spatially separated more than one acousto-optic devices making them complex, hard to align and expensive or could not achieve high-isolation and low-insertion loss performance. A simple structure of 2×2 fiber-optic matrix switch with one phased array transducer as disclosed here is expected to make acousto-optic based fiber-optic switches more attractive than similar MEMs based switches. Use of shared lens instead of individual lenses at the input and output fiber array is expected to further reduce complexity and cost of the acousto-optic based fiber-optic switches.

4 Claims, 7 Drawing Sheets

FIBER-OPTIC MATRIX SWITCH USING PHASED ARRAY ACOUSTO-OPTIC DEVICE

BACKGROUND OF INVENTION

This invention is in the field of active Fiber-Optic (FO) components and specifically in the field of FO matrix switch. This disclosure of my invention describes methods of implementing several functions in FO systems without any moving parts. These functions include, for example, N×N matrix switching with variable coupling, variable strength multiple port coupling, electronically variable attenuation, frequency shifting, and wavelength selection. All FO systems and networks encompassing telecommunication, data-communication, remote sensing, etc. utilize switching and other above-mentioned functions. My invention could be easily incorporate in those FO systems and would enhance system performance. The invention disclosed here falls into the specific category of high speed, high isolation, no moving parts phased array Acousto-Optic (AO) FO matrix switches.

Electro-mechanical movement of reflective or refractive elements commonly performs switching functions in FO systems and networks. Electro-mechanical movement is characterized by slow response time and low reliability. Recent advances with MicroElectroMechanical Systems (MEMs) based FO matrix switches (see articles by Daniel C. McCarthy and L. Y. Lin et al.) have improved speed and made MEMs switches the most widely used in the market, but speed is still in the millisecond range. Many FO systems and networks, such as packet switched voice and video traffic on Internet, require switching speed in the microsecond or sub-microsecond range. Electro-mechanical FO switches, even with MEMs technology, cannot operate in the microsecond range. The invention disclosed here would allow FO switches to operate at high speed (in sub-microsecond range) with high isolation and without moving parts. The FO switch scheme disclosed here is based on deflection of light by an AO deflector having one or more phased array transducers. This innovative FO switch will improve the performance and lower the cost of FO systems and networks.

Nabeel Riza in U.S. Pat. No. 6,282,336 B1 has disclosed a 2×2 FO switch using AO deflection. Several other attempts were made to realize FO switch using AO technology as listed in the said Riza's patent (also see article by Huang, P. C.). Earlier patents on 2×2 FO matrix switch that utilized a single AO deflector with zero and first-order deflected beams did not address inadequate (<50 dB) isolation problem. In other instances FO matrix switches required more than one AO deflectors and did not provide low insertion-loss. Two AO deflectors and an additional component such as a Dove Prism are used in Riza's patent to improve the isolation and realize low-insertion loss. However, the extra deflector and Dove prism add cost and increase the complexity of such a FO switch. The cost and complexity of Riza's 2×2 FO switch is expected to limit its use in general. My invention discloses high (>50 dB) isolation 2×2 FO switch using a single AO deflector without any additional optical element such as a Dove Prism. My invention will allow substitution of a common optical element (lens) for an array of individual collimating or GRIN lens at the input and output ends of fibers, further simplifying the construction of the switch.

U.S. Pat. No. 6,236,479 B1 by Gosseline et al. discloses an N×N FO matrix switch using two multi-channel AO deflectors. The said patent also contains description and mentions disadvantages such as high optical insertion loss, cross-talk and complexity of prior art N×N FO matrix switch schemes. Intend of my invention is to achieve similar FO switching function and performance as possible using schemes disclosed by Riza and Gosseline et al. in their respective patent but with only one AO deflector. An AO deflector with N phased array transducers as disclosed here can theoretically direct nearly 100% optical power from any input fiber to any output fiber. That makes a larger N×N FO matrix switch possible without any increase in the insertion loss or complexity.

As with many AO based FO switches, my invention can be used for high-resolution electronically variable optical attenuation, Wavelength Division Multiplexing (WDM), and other functions well known in the art of FO.

SUMMARY OF INVENTION

Methods of utilizing an AO phased array transducer deflector to produce high isolation FO matrix switch are disclosed here. A single phased array transducer AO device is shown to accomplish a 2×2 FO matrix switch. A larger N×N FO matrix switch (N>2) using N phased array transducers in series on one AO deflector is also disclosed.

One aim of the present invention is to produce an N×N FO matrix (N equal or greater than 2) AO switch that can be constructed with fewer components. With my invention as shown in FIG. 1 only one phased array transducer AO device is required for a 2×2 FO matrix switch in contrast to two AO devices and a passive Dove Prism structure required for the same switch according to Riza's disclosure (U.S. Pat. No. 6,282,336 B1).

It is well known that a phased array transducer pattern on a piezoelectric plate 35 (FIG. 1) produces two acoustic beams at symmetric angles from normal to the transducer surface (see articles by Manhar L. Shah et al., I. C. Chang, and A. J. Hoffman et al.). The angle at which the acoustic beams are produced by phased array change with frequency. Phased array transducers in AO deflectors are commonly used to improve the AO interaction bandwidth. That is because they allow "tangentially" phase matched Bragg interaction (meaning; as the RF frequency is changed the acoustic wave-vector tip of one acoustic beam moves along the tangent to the optical wave-vector surface as shown by a line 150 in FIG. 2. Also, the other acoustic beam's wave-vector tip moves along a parallel line 150" in the same figure.) Depending upon the incident angle of a given optical beam, wideband AO deflection becomes possible for either up-shift or down-shift interaction. For a 2×2 FO matrix switch, an optical beam from one fiber is aligned to cause, for example an up-shift, while the beam from the other fiber is aligned to cause a down-shift. Perfect Bragg matching conditions for both optical beams occur simultaneously at two specific frequencies, $f_s$ and $f_c$ with corresponding up-shift and down-shift acoustic wave-vector marked $K_{s+}$, $K_{c+}$, $K_{s-}$ and $K_{c-}$ in FIG. 2. The perfect Bragg matching condition ensures high efficiency AO interaction. The positions of the deflected optical beams exchange as the frequency is changed from one perfect Bragg matching state ($f_s$) to another perfect Bragg matching state ($f_c$) or vise versa. That means switching between straight and cross paths which is the basic operating principle of a 2×2 FO matrix switch, becomes possible with a change in RF drive frequency. High isolation results because only the deflected optical beams are used for the outputs. Perfect Bragg matching for each optical beam in both the straight and cross connection states helps achieve low throughput loss operation of the switch.

The deflected optical beam intensity from an AO device peaks when the Bragg matching is perfect. It also remains fairly constant in the vicinity of such operating point. Therefore, the throughput of a phased array AO based FO matrix switch remains sufficiently uniform and high for a range of RF frequencies in the vicinity of the perfectly Bragg matched operating points characterized by frequencies $f_s$ and $f_c$. Therefore, the perfect Bragg matching condition frequencies should not be considered as the restriction in my invention for operation of a 2×2 FO matrix switch. In addition, active beam alignment capabilities of an AO device via RF frequency tuning are well preserved with the operation of a phased array AO transducer FO matrix switch near perfect Bragg matching points.

Properties of a phased array transducer AO device can be exploited in construction of a larger array (N>2) FO matrix switch. The AO interaction for a particular optical beam incident angle is strongly dependent upon the RF frequency and pitch of a phased array transducer. Consider N collimated optical beams with different incident angles passing through an AO deflector having N serially arranged phased array transducers, each having a different pitch. Each combination of phased array transducer and an optical beam will have a limited frequency range for the RF drive in which the AO interaction is sufficiently strong. This frequency range is determined by the transducer's pitch and the incident angle of the optical beam. All deflected beams fall into a range of angles near the tangential phase matching point as it happens with phased array transducers. By selecting different pitch and drive frequencies for each of the serially arranged phased array transducer patterns on a piezoelectric plate 36 shown in FIG. 4 one can deflect any incident beam to a chosen output beam angle. That makes an N×N (N>2) FO matrix switch possible. Understanding of the operation of 2×2 and N×N (N>2) FO matrix switch will be made clear later with the help of the "Bragg Matching diagram." The dependence of AO interaction efficiency on the optical beam incident angle in a phased array transducer device can be further exploited in simplifying FO matrix switches. Usually, a fiber array is formed with fibers placed in parallel fashion with some designed or selected spacing between each. A collimating micro lens or GRIN lens is included near each fiber tip to produce parallel optical beams from such an array. In my invention, the optical beams for N×N FO matrix switch are collimated and in a fan-shape with the apex near the AO interaction region. Such a fan-shape can be easily achieved with one shared collimating lens in front of the fiber array rather than a lens for each fiber. FIG. 1 shows this shared collimating lens type 2×2 FO matrix switch with a phased array AO transducer. FIG. 3 shows a 2×2 FO matrix switch similar to FIG. 1 but each fiber has its own collimating lens. Item no. 20 and 40 in FIG. 1 represents the shared collimating lens, while item no. 120, 130 and 230, 240 in FIG. 3 show the collimating lenses for each fiber end. A fiber array with tips positioned on a circular arc and a GRIN or micro collimating lens for each fiber end also produces a similar result. The shared lens, micro lens and GRIN lens type fiber arrays are depicted in FIGS. 4, 5 and 6, respectively to yield N×N FO matrix switches with the phased array transducers AO device.

With the arrangement of FO switches as shown in FIG. 3, 4 or 5, efficient AO interaction occurs with only one optical beam incident at a particular angle to the selected phased array transducer. Therefore, one phased array transducer can deflect an optical beam from a selected fiber to a range of output angles controlled by the RF frequency. However, each optical beam is deflected into the same angular range that cover the output fiber array. Therefore, any input fiber can be coupled to any output fiber. Moreover, the strength of coupling can be controlled by the RF drive power to the transducer. Multiple frequency excitation of each transducer is also possible. That allows one to couple any input fiber to multiple output fibers with a desired strength of coupling for each.

DETAILED DESCRIPTION

Figure 1:
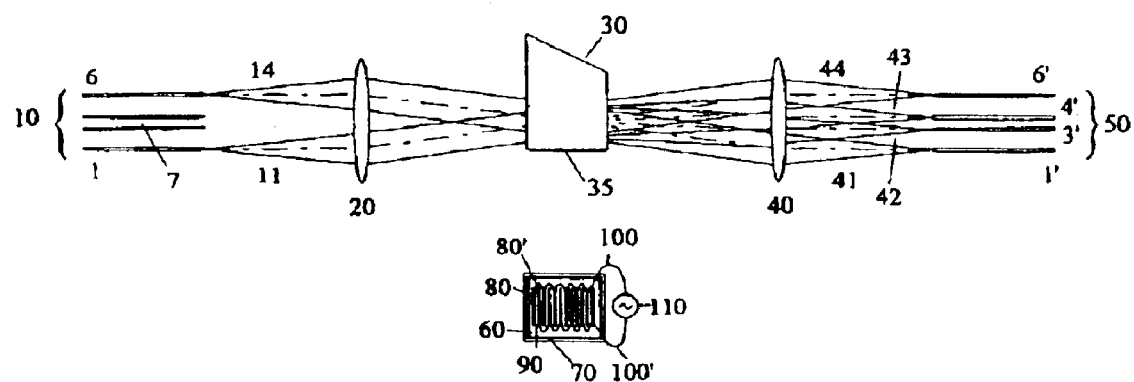
FIG. 1 shows a 2×2 FO matrix switch using a phased array transducer AO device and a shared collimating lens at each input and output fiber array.

FIG. 1 shows one of the preferred embodiments of the current invention. The transducer 35 is fabricated with piezoelectric plate 60 bonded to an AO device material body 30 with bonding agent 70 consisting of several thin metallic layers deposited by vacuum or plating process. The bonding layer in the phased array transducer is usually floated, meaning the electrode is not connected at any place. The transducer's active area is defined by the top electrode pattern. In the preferred embodiment the phased array pattern is selected for the top electrode. The phased array pattern consists of periodic metallic film stripes 80 and 80" with gaps 90. The pattern is chosen to have a fill factor in the range of 0.1 to 0.9 to optimize the coupling between the RF and acoustic field. This pattern is known as "inter-digital pattern." The alternate electrodes are connected by thin wires 100 and 100" forming two groups and are excited with RF drive signal 110 while the bottom metallic layer of the transducer is allowed to float. This results in out-of-phase (180°) excitation of alternate striped regions.

Fiber array 10, consisting of two input active fibers marked 1 and 6, are placed in parallel arrangement with a space 7 (equal to s) between them. The space s is calculated from design parameters such as AO deflection angle, geometrical distances, and optical lens data. Input optic 20 near the input fiber array collimates the optical beams. These optical beams intersect at a distance b from the input optics where b is an equivalent focal length of the input optics. The arrangement is schematically shown in FIG. 1. It is obvious that the optical beams intersect at an angle, a~s/b. The design is implemented to make each optical beam produce AO interaction in a nearly tangentially phase matched condition (to be explained later), for deflection by one of the acoustic beams.

The deflected output beams are made parallel and focused by the output optics 40. The output fiber array 50 consisting of four parallel fibers marked 1", 3", 4" and 6" placed at a chosen separation receives output light from the lens. The inner two fibers marked 42 and 43 receive the diffracted (or deflected) beams. The outer fibers marked 41 and 44 receive the undiffracted (or undeflected) beams for use in diagnostic or other applications. In a common crossbar matrix switch application each output fiber receives light from only one of the input fibers. However, with my invention any fraction of light intensity from each input fiber can be diffracted into one or both output fiber channels with multi-frequency RF excitation. When the RF frequency is changed from the straight-value $f_s$ to cross-value $f_c$ or vice versa the deflected optical beams get switched performing a 2×2 FO matrix switch function.

Figure 2:
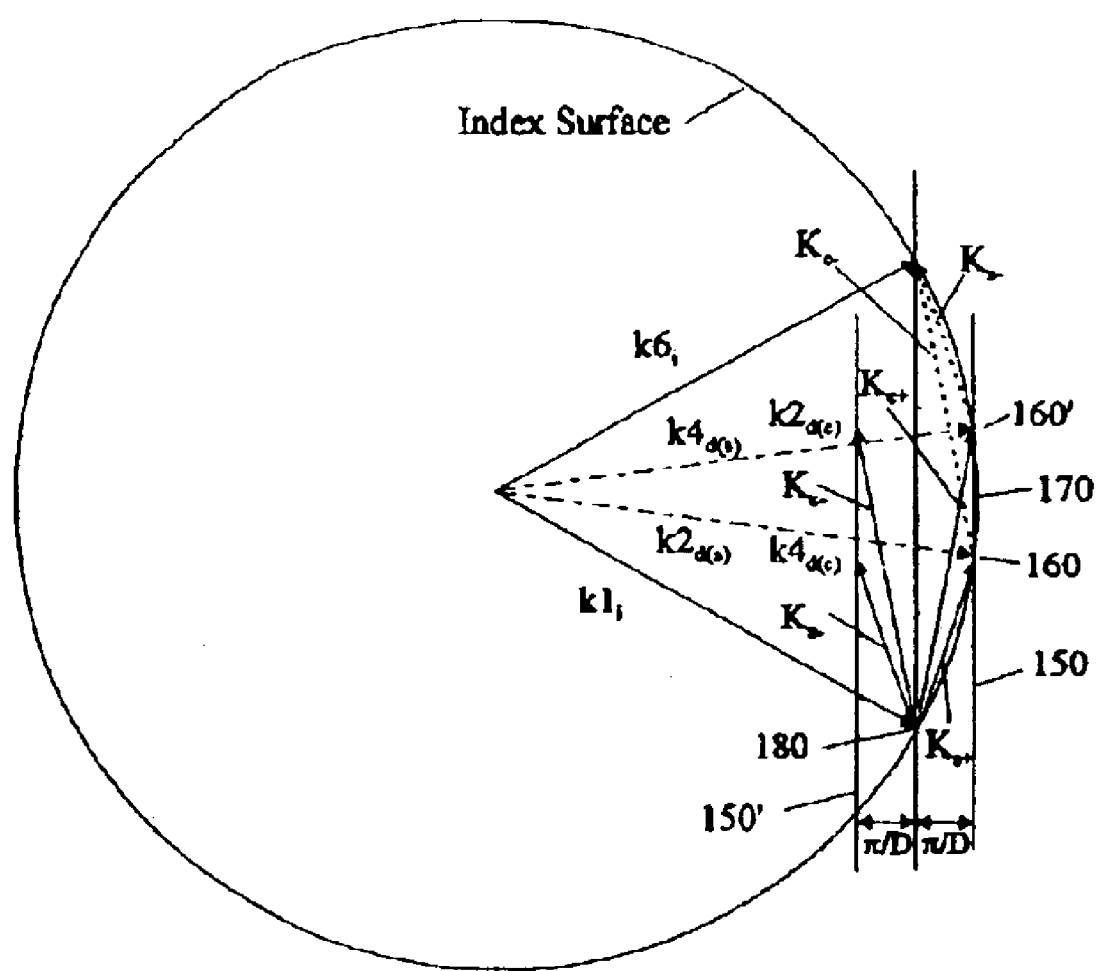
FIG. 2 shows an AO interaction Bragg matching diagram of a phased array transducer 2×2 FO matrix switch.

The out-of-phase excitation of the striped regions of a phased array transducer generates two acoustic beams. These beams propagate at angle $+/-v/2fd$ (small angle approximation) from the transducer surface normal, where v=acoustic velocity, f=RF drive frequency, and d=periodic spacing of the stripes in the phased array. The acoustic wave-vector and its tip movement with changing RF excitation frequency in a phased array transducer AO device can be described in the momentum space, also known as a Bragg matching or phase matching diagram (FIG. 2.) In the momentum space the acoustic wave-vector tip moves along a line numbered 150 in FIG. 2, normal to the transducer surface at a distance $\pi/d$ for one acoustic beam while along a line numbered 150" in the same figure at $-\pi/d$ for the other beam as the RF frequency is changed. The optical wave-vector tip follows a circular (for an isotropic case or elliptical in general for an anisotropic case) locus as the incident angle is changed. The combined Bragg matching diagram takes the characteristic form as shown in FIG. 2 for a 2×2 FO matrix switch. If one makes $v/fd\sim s/2b$, then the up-shift condition is satisfied at lower point 160 for one optical beam while the down-shift condition is satisfied at upper point 160" for the other optical beam when the acoustic wave-vector, $K_{s-}$ is moved up as depicted by the dotted line. The deflected beams represented by the optical wave-vectors $k2_{d(s)}$ and $k4_{d(s)}$ in FIG. 2 at RF frequency $f_s$ (referred here as the straight-path frequency) satisfy the exact Bragg matching condition providing efficient AO interaction. When the RF frequency is changed to $f_c$ (referred here as the cross-path frequency), deflected beams are switched as represented by $k4_{d(c)}$ and $k2_{d(c)}$ again with exact Bragg matched efficient AO interaction.

One peculiar characteristic of "tangentially matched" AO interaction that occurs in phased array transducer AO devices is known as the "degenerate condition." AO interaction with one of the acoustic beams of a phased array transducer at exact tangential point 170 satisfies the perfect Bargg matching condition for the deflected beam involving the other acoustic beam of the phased array. This causes pronounced re-deflection and appears as loss in deflection efficiency. The re-deflection occurs for a very narrow range of RF frequency and can be avoided by not using any fiber channel in that range of RF frequency.

Figure 3:
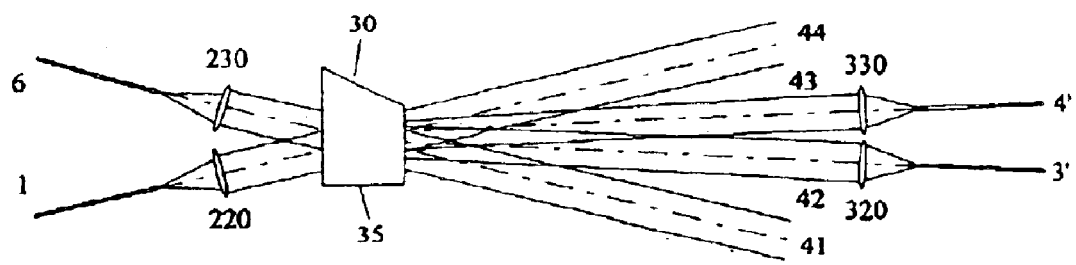
FIG. 3 shows a 2×2 FO matrix switch using a phased array transducer AO device with collimating lens (comprising micro or common lens) at each fiber in the input/output arrays.

An N×N FO matrix switch with N>2 can be constructed with serially placed N phased array transducers on an AO device. For example, FIG. 3 shows a 4×4 FO matrix switch with four closely placed phased array transducers, T1, T2, T3, and T4 in sequential fashion along the AO interaction path. The phased array spacing of each transducer is chosen sufficiently different so that negligible AO interaction occurs for all optical beams except one. This discrimination is achieved by arranging all optical beams in a fan shape, each having different incident angles so that Bragg matching occurs for only one beam. This principle is illustrated with the Bragg matching diagram presented in FIG. 7. Acoustic wave-vector tips from each transducer follow line 150 as the RF frequency changes while each base point of the vector (181, 182, 184 and 185) occurs at different locations as shown. The optical wave-vector tip should be at the base point for efficient AO interaction. By arranging one optical beam per base point one achieves the objective. It is clear from the Bragg matching diagram that the operating range of RF frequency of each phased array would be different. Also, one avoids the "degenerate region" by placing channels away from the center 170.

The idea of a 4×4 FO matrix switch can be extended to a larger value of N. Since longer AO devices are impractical, a value of N=16 or perhaps N=8 may be the practical limit of a FO matrix switch of this kind. To further understand the principle of operation, I explain here in detail a 4×4 FO matrix switch.

Figure 4:
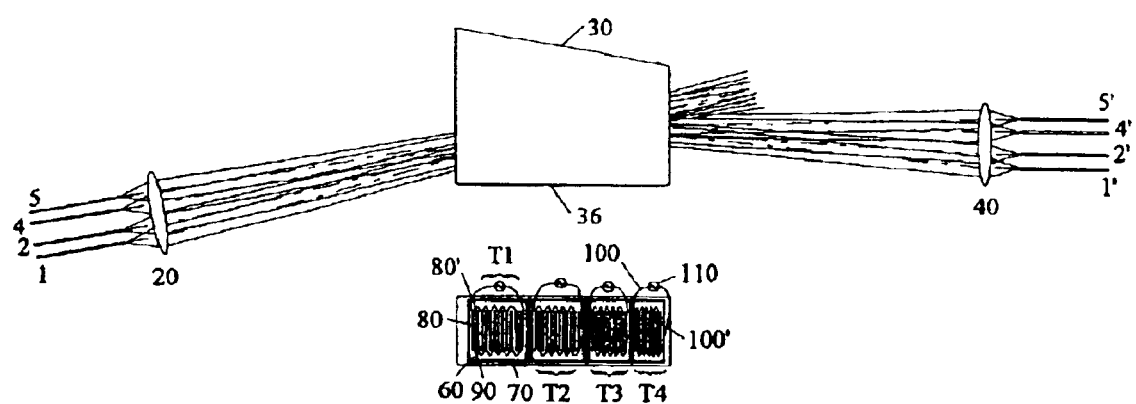
FIG. 4 shows an N×N (N=4) FO matrix switch using a phased array transducer AO device with a shared lens (without individual collimating lenses) for the input/output fiber arrays.
Figure 5:
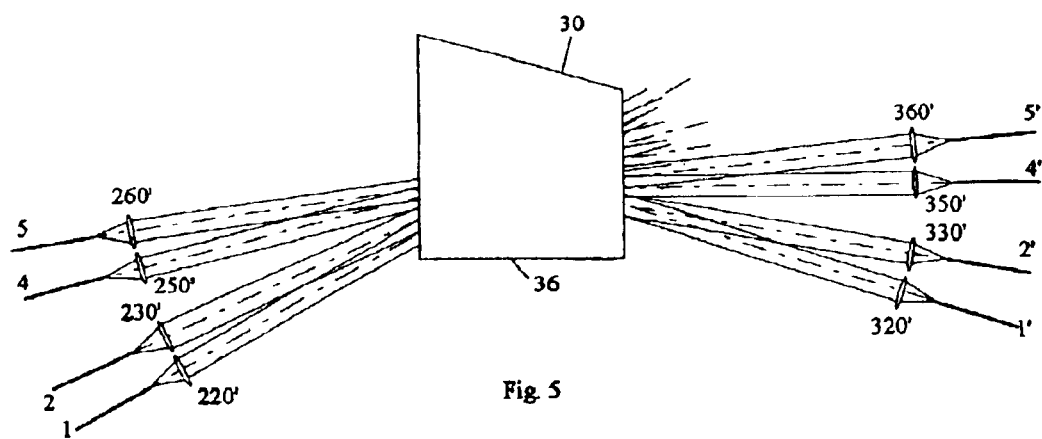
FIG. 5 shows an N×N (N=4) FO matrix switch using a phased array transducer AO device with individual collimating micro-lenses at each fiber tip of the input/output fiber arrays.
Figure 6:
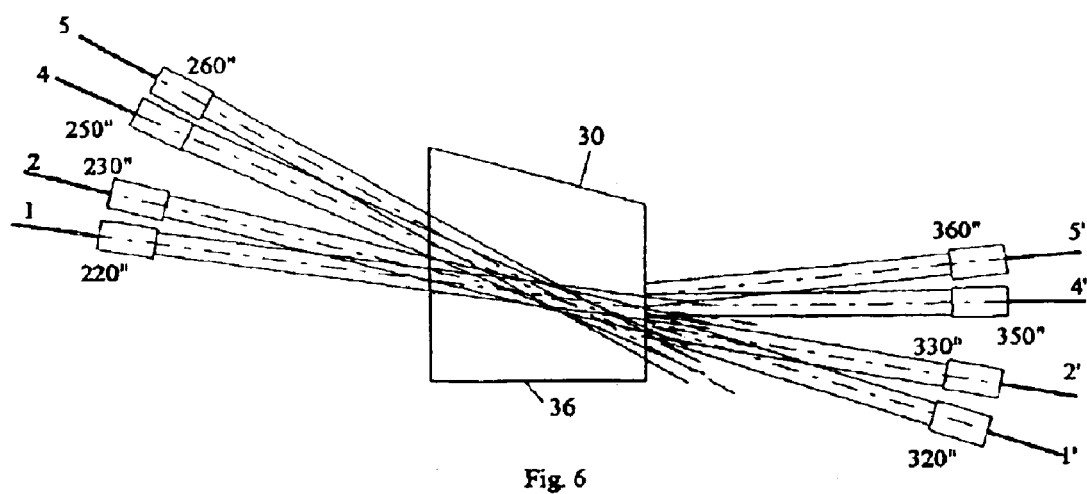
FIG. 6 shows an N×N (N=4) FO matrix switch using a phased array transducer AO device with an individual GRIN lens at each fiber tip of the input/output fiber arrays.

FO matrix switch operation requires collimated optical beams from each fiber to pass through the AO interaction region at different angles. This can be made possible by either using a parallel fiber array with a single shared input optic 20 as shown in FIG. 4. This also can be made possible with individual collimating micro input lenses 220"–260" as in FIG. 5 or individual collimating GRIN input lenses 220"–260" as in FIG. 6, respectively, with array in an arc form. Due to serial placement of phased array transducers, a slight parallax exists when the beams are deflected. However, the output fiber array is situated at a much larger distance from the AO device in comparison to the length of the AO device, thereby reducing the effect of parallax. The form of the output fiber array can be selected in a similar fashion as an input with a single output optic 40 or individual collimating micro-lenses 320"–360" or GRIN lenses 320"–360". Although a single lens for an array appears simple, the individual collimating lenses or GRIN lenses scheme for the output array may be superior in some cases with specific design constraints. The required time-bandwidth product, which approximately equals the number of resolvable spots of an AO deflector, is only of the order of the number of fibers divided by the fill factor for a lens per fiber case. For a single lens at the output fiber array, the required time-bandwidth product nearly equals fiber array length divided by the core diameter, roughly 10 to 12 times the first case. An N×N FO matrix switch with N~8 may cause AO design difficulties to achieve larger time-bandwidth product deflector. Therefore, a lens per fiber for the output array may be preferable when considering a larger FO matrix switch.

Figure 7:
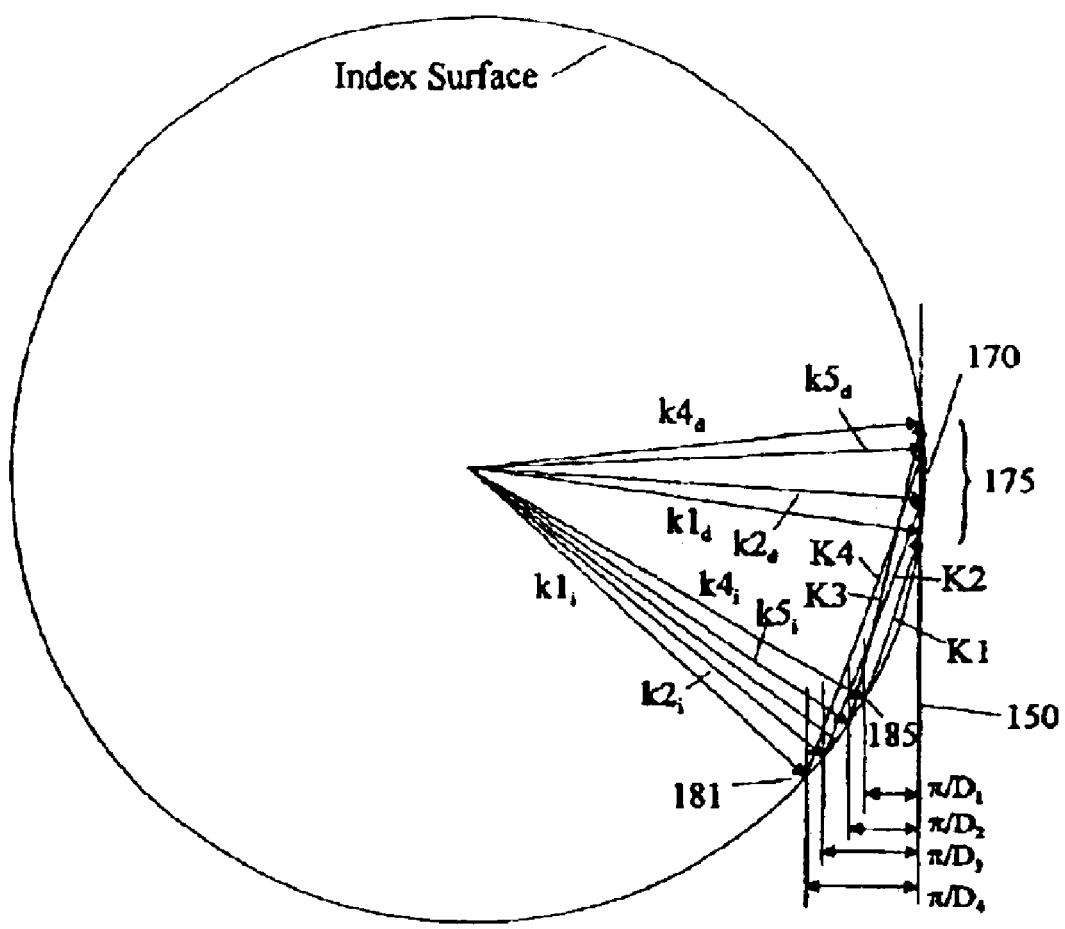
FIG. 7 shows a Bragg matching diagram of phased array transducer AO interaction in an N×N (N=4) FO matrix switch.

Efficient AO interaction in a phased array device occurs for a narrow range of optical beam incident angles. Beams that are at a different angle than matching pass through without significant effect. The optical beam direction deflected by a phased array varies with RF frequency changes. Therefore, a strongly interacting deflected beam can be swept or scanned by changing the RF frequency. The resolution and range for scanning is designed to allow coverage over a full fiber array with optical beam spot size at fiber nearly equal to the fiber core. The tangentially matched AO interaction occurs for all phased arrays with a common beam deflection angle range, 175, as shown in FIG. 7. An output fiber array with output optics collects all deflected beams to couple to individual fibers in the array.

Thus, each light from each input fiber selectively interacts with one phased array and by selecting the proper drive frequency for that phased array, light can be deflected to any desired output fiber.

The switching speed of an AO deflector is primarily governed by the optical beam size and is of the order of "transit time" of acoustic waves through the optical beam. A practical FO switch would not use an optical beam size much greater than 5 mm. Using common AO materials as a guide, one concludes that the transit time wouldn't be more than 2 $\mu$s. Hence, a 2 $\mu$s or less switching time can be reasonably expected with the phased array AO device FO matrix switch.

It should be noted that characteristics similar to a phased array transducer can also be achieved by other means such as: placement of a grating structure beneath a non-phased array transducer; an alternately poled striped piezoelectric transducer; or feeding a striped transducer structure with sequentially delayed RF signals. It is common practice in AO device technology to use apodized transducer with apodization geometry e.g. diamond or Gaussian. The apodization is used to lower the side-lobes in the deflected optical beam. My invention can utilize any such variations to improve the performance of a FO matrix switch.

In addition to isolation and speed, specifications of a FO matrix switch may include throughput efficiency, polarization dependent loss, back reflection, size, plus some others. Design illustrations in the next section may prove helpful in obtaining theoretical values of those specifications. They also show how various parameters are related and how to construct 2×2 and N×N (N>2) FO matrix switches with desired characteristics.

Design and Construction Illustrations

Design of a phased array AO deflector based 2×2 and N×N (with N=4) FO matrix switch will be illustrated in this section. The design parameters and construction details are intended for illustration purposes only. A marketable FO matrix switch may have significant variations to accomplish desired specifications and cost competitiveness. For example, the simple one element lens may change to complex multi-element lens optics for input and output. Design of complex optics is well established with numerous software tools available in the market that prescribe specific data for these lenses. A single lens with its focal length and aperture size is sufficient to illustrate the input/output optics of the switch being designed. Similarly, specifications of center frequency, bandwidth and size of a transducer is sufficient for an AO device. The design and construction illustration of a 2×2 FO matrix switch will be given first then an N×N (N=4) FO matrix switch will be illustrated.

2×2 FO Matrix Switch Illustration

Common single mode fibers (SMFs) have a 0.13 numerical aperture, meaning that the optical beam emerging from such a fiber will have approximately 0.13 radian angular spread. Fiber arrays are formed using Si V-grooves. Readily available Si V-grooves have 0.25 mm spacing. It is prudent to illustrate the design using practical and readily available products. For simplicity, identical fiber arrays and lenses are selected for the input and output for this illustration. From the Bragg matching diagram in FIG. 3 one ascertains that the AO deflection from outermost fibers to innermost fibers or vice versa be used. The angular relation of optical beams and so, the RF frequency relation for deflection is proportional to the relative distances of fibers. Therefore, if one uses a 4-fiber array then the deflection range would be ⅔ (66%) of the mean value requiring a 66% fractional bandwidth for the AO device. High fractional bandwidth AO devices require tighter manufacturing tolerance and are usually less efficient. A 50% or 40% fractional bandwidth is better suited for production type FO matrix switch construction. A 6-fiber array would require 40% fractional bandwidth. Therefore, a 6-fiber array is selected for the input and output. Fibers in the input array are labeled 1 to 6 and in the output array are labeled 1" to 6" (bottom to top) in FIG. 1. Fiber no. 1 and 6 in the input array are used as input channels while fiber no. 3" and 4" in the output array are used as output channels. As mentioned previously input and output can be interchanged, meaning the phased array AO device FO matrix switch is a reciprocal device.

One designates spacing between fibers as sand focal length of the lens as F. The deflection range, $\Delta\theta$, of the AO device can be expressed as $\Delta\theta=s/F$ for the innermost fibers used as the output. The fractional bandwidth of 40%, meaning $\Delta\theta=0.4\theta_0$, relates the center angular deflection to s and F. Using the AO deflection relation, $\theta_0=\lambda/\Lambda_0$ one obtains $\Delta\theta=0.4\lambda/\Lambda_0$ where $\lambda$ is the free-space optical wavelength and $\Lambda_0$ is the acoustic wavelength at center frequency, which for acoustic velocity v equals $v/f_0$. Substitution gives $\Lambda_0=0.4 \lambda$ F/s. The next step is to determine what value of $\Lambda_0$ is acceptable for the AO material. $\Lambda_0$ and F are proportional so a larger F would require a larger $\Lambda_0$, i.e., lower RF frequency. A Lower RF frequency is desirable but that results in a larger size for the matrix switch as well. Suitable frequency range of an AO device depends upon the AO material characteristics.

FO products with low polarization dependent loss are attractive and most system applications require such a characteristic for a FO matrix switch. On the other hand, several well-established AO materials exhibit significant deflection efficiency difference when optical polarization is changed from one to another. Some AO materials while usable in the visible spectrum cannot be used at 1550 nm, a preferred wavelength in the FO field. That is because the AO efficiency is inversely proportional to the square of the wavelength. At 1550 nm, AO efficiency will decrease to about 10% of the value at 500 nm. Combined requirements rule out most known AO materials for FO applications at 1550 nm. An infrared material known as AMTIR has become popular for the AO interaction in the FO field due to its high AO figure-of-merit and low polarization dependent loss. Shear mode in GaP or isotropic longitudinal mode in $TeO_2$ can provide polarization independent efficiency but at much reduced efficiency values compared to AMTIR. AMTIR is selected for illustration. Acoustic attenuation in AMTIR limits its use below 300 MHz. The acoustic velocity in AMTIR is 2.52 km/s and its index of refraction is 2.55. Using the relations obtained earlier one finds that F=21 mm when 50 MHz center frequency is used. A center frequency near 200 MHz is preferable to obtain Bragg regime AO interaction within short distances. Increasing the center frequency to 200 MHz, a smaller value of F equal to 5.1 mm, can be used. These numbers are quite practical and a compact 2×2 FO matrix switch is realizable. Selecting a larger fiber number V-groove array and skipping some positions between active channels can also increase the center frequency.

The focal length, F, of the lens determines the optical beam size, W, in the AO device. The beam size is approximately equal to the fiber's numerical aperture multiplied by F. At a center frequency of 200 MHz, W is approximately equal to 0.65 mm. Improvement in AO efficiency is possible with a decrease in optical beam size perpendicular to acoustic wave propagation. However, such a decrease in beam size requires cylindrical lenses, which increase the complexity of the FO matrix switch assembly. One avoids cylindrical lenses in the illustration by selecting 1 mm transducer height, somewhat larger than the optical beam size. Now AMTIR material properties and standard AO design procedure can be utilized to compute the transducer data. Using simple AO design tools one obtains the sub-electrode or phaselet spacing for a transducer as 261 µm and the maximum overall active length of a transducer as 13 mm. One can select a transducer length smaller than 13 mm, provided the AO interaction remains in the Bragg regime so that diffraction occurs only in one direction. Nearly 100% deflection is predicted with about 0.5 watt RF drive power for the illustrative FO switch. The design parameters of the illustrative FO matrix switch provide an estimate of the spectral bandwidth over which the switch will operate. The estimated spectral bandwidth is 80 nm. The optimum RF frequencies vary somewhat with wavelength. However, efficient operation can be maintained at any wavelength within the spectral bandwidth by slightly adjusting the RF frequency and drive level. An intelligent controller can be used to set these parameters according to the wavelength.

NxN (N=4) FO matrix switch illustration

The relations among angular beam position, optical beam size, focal length of lens, etc. presented for a 2x2 FO matrix switch are also applicable to an NxN FO matrix switch. In order to avoid the degenerate AO interaction condition one selects a 5-fibers array for the input and output and not use the center position. The AO device should be capable of deflecting beams in a 4s/F angular range that is selected as 40% of the center deflection position similar to a 2x2 matrix switch. We obtain the relation $\Lambda_0=0.4$ $\lambda$F/4 s for the NxN (N=4) case. The center frequency of 100 MHz requires F=40 mm, which is somewhat larger so one selects 200 MHz center frequency and obtains F=20 mm. The computed optical beam size is W=2.6 mm for 200 MHz center frequency operation. It is advisable to decrease the beam height to about 0.5 mm by inclusion of a cylindrical lens or a prism with input and output optics so that lower RF drive power can be used.

The operation of an NxN FO matrix switch as depicted in FIG. 4 depends upon an acoustic beam from one phased array transducer interacting only with one input optical beam. The center frequency cannot be common for all phased array transducers. Let the center frequency for the input fiber channel 2 equal to 200 MHz. The center frequency for the input fiber channel 1 will be slightly larger while it will be smaller for channels 3 and 4. The incremental frequency difference between adjacent input channels is approximately 20 MHz for the array spacing and input lens focal length used in the illustration. Therefore, input channel 1 will have a center frequency of 220 MHz, while channels 3 and 4 will have center frequencies 160 and 140 MHz, respectively.

Transducer, T2 in FIG. 4 controls channel 2 input light. The phaselet spacing of T2 is 261 µm, the same as the 2x2 FO matrix switch illustration due to an identical center frequency. The phaselet spacing for transducers T1, T3 and T4 is 215, 407 and 532 µm respectively. The maximum active length of a transducer to achieve the required bandwidth for channels 1, 2, 3 and 4 is calculated to be approximately 10.7, 13, 20 and 26.6 mm. These lengths are too long for a practical device. A transducer length can be shortened up to a value that meets channel isolation specification. An acoustic diffraction spread equal to about half the angular difference of input beams is sufficient for channel-to-channel isolation. Transducer lengths for T1, T2, T3, and T4 equal to 4.67, 5.14, 6.4, and 7.34 mm, respectively meets that criterion. The total active length of an AO device adds to 23.5 mm, which is reasonable from the practical viewpoint. One calculates from the transducer data that about one watt of RF drive power will be required per transducer for nearly 90% deflection efficiency. The spectral bandwidth is somewhat larger for this switch than the 2x2 matrix switch due to shorter transducer lengths.

While I have shown and described several embodiments in accordance with the present invention, it is to be understood that the same is not limited thereto but is amendable to numerous changes and modifications as known to a person skilled in the art. I therefore do not wish to be limited to the details shown and described herein but intend to cover all such changes and modifications as are obvious to one of ordinary skill in the art.

What is claimed is:

1. An NxN with N≧2 Fiber Optic matrix switch consisting:
an N-fiber input array, an input lens, a single Acousto-Optic device with piezoelectric transducers, each having N distinct (as defined by an electrode period) phase arrays, an output lens, an N-fiber output array and an electronic driver having an interface to accept control signals and generate RF signals in response so as to excite the said N phased array transducers for producing acoustic waves to deflect a programmable intensity of light from each of the input fibers to each of the output fibers.

2. A FO matrix switch as in claim 1 and in which either one or both of the input and output fiber array are on an arc with optical beam from each fiber collimated by either a GRIN lens or a conventional micro-lens array instead of the shared lens.

3. A 2x2 Fiber Optic matrix switch consisting:
a two-fiber input array, an input lens, a single Acousto-Optic device with one phased array piezoelectric transducer, an output lens, a two-fiber output array and an electronic driver having interface to accept control signals and generate RF signals in response so as to excite the said phased array transducer for producing Acoustic waves, said transducer configured so as to deflect a programmable weighted intensity of light from each of the input fibers to each of the output fibers utilizing Bragg matching for one input/output set with +1 order acoustic beam and for the other input/output set with -1 order acoustic beam.

4. A 2x2 FO matrix switch as in claim 3 and in which either one or both of the input and output fiber array are on an arc with optical beam from each fiber collimated by either a GRIN lens of a comventional micro-lens array instead of the shared lens.

* * * * *